(12) United States Patent
Barenbrug

(10) Patent No.: US 8,447,141 B2
(45) Date of Patent: May 21, 2013

(54) METHOD AND DEVICE FOR GENERATING A DEPTH MAP

(75) Inventor: Bart G. B. Barenbrug, Eindhoven (NL)

(73) Assignee: Koninklijke Philips Electronics N.V, Eindhoven (NL)

( * ) Notice: Subject to any disclaimer, the term of this patent is extended or adjusted under 35 U.S.C. 154(b) by 215 days.

(21) Appl. No.: 13/127,263

(22) PCT Filed: Nov. 2, 2009

(86) PCT No.: PCT/IB2009/054857
§ 371 (c)(1),
(2), (4) Date: May 3, 2011

(87) PCT Pub. No.: WO2010/052632
PCT Pub. Date: May 14, 2010

(65) Prior Publication Data
US 2011/0210969 A1 Sep. 1, 2011

(30) Foreign Application Priority Data
Nov. 4, 2008 (EP) .................................... 08168248

(51) Int. Cl.
*G06K 9/32* (2006.01)
(52) U.S. Cl.
USPC ........... 382/298; 382/154; 382/167; 382/260; 358/3.26; 358/463; 358/518
(58) Field of Classification Search
USPC ................. 382/154, 167, 260, 274, 275, 278, 382/298; 358/3.26, 3.27, 463, 518, 520
See application file for complete search history.

(56) References Cited

U.S. PATENT DOCUMENTS 6,975,329 B2 * 12/2005 Bastos et al. .................. 345/587
6,999,087 B2 * 2/2006 Lavelle et al. ................ 345/543
(Continued)

FOREIGN PATENT DOCUMENTS

| WO | WO2005076215 A1 | 8/2005 |
| WO | WO2006003577 A1 | 1/2006 |
| WO | WO2008062351 A1 | 5/2008 |

OTHER PUBLICATIONS

Database Compendex [Online] Engineering Information, Inc., New York, NY, US; Sep. 6, 2004, Ansar A et al: "Enhanced real-time stereo using bilateral filtering", Database accession No. E2005169044956, p. 457-460, XP002518990.

(Continued)

*Primary Examiner* — Yosef Kassa
(74) *Attorney, Agent, or Firm* — Larry Liberchuk

(57) ABSTRACT

The present invention relates to a device and method (100) of generating a depth map for an image using monocular information, the method comprising: generating (110) a first depth map for the image (205), wherein the first depth map corresponds with an estimate of a global depth profile of a scene depicted in the image, generating (120) a second depth map for the image, wherein a depth value associated with a pixel in the second depth map is based on depth values in the first depth map within a region spatially proximate to the pixel and at least one of color and luminance values of the image within the region and generating (130) a third depth map for the image using depth values from the first depth map and the second depth map, the generating scaling a depth difference, such that a difference between a depth value of the third and first depth map is scaled compared to the corresponding difference between a depth value of the second and first depth map. The invention further relates to a computer program product for use in executing the method according to the present invention.

16 Claims, 5 Drawing Sheets

U.S. PATENT DOCUMENTS

| | | | | |
|---|---|---|---|---|
| 7,675,024 | B2* | 3/2010 | Lenchenkov | 250/226 |
| 7,738,725 | B2* | 6/2010 | Raskar et al. | 382/266 |
| 8,253,733 | B2* | 8/2012 | Kim et al. | 345/419 |

OTHER PUBLICATIONS

Database Compendex [Online] Engineering Information, Inc., New York, NY, US; Mar. 3, 2004, Atzpadin N. et al: "Stereo Analysis by Hybrid Recursive Matching for Real-Time Immersive Video Conferencing", Database accession No. E2004188145391, IEEE Transactions on Circuits and Systems for Video Technology—Immersive Telecommunications Mar. 2004 Institute of Electrical and Electronics Engineers Inc., US, vol. 14, No. 3, Mar. 2004.

Database Compendex [Online] Engineering Information, Inc., New York, NY, US; Apr. 26, 2004, Battiato S et al: "Depth-map generation by image classification", Database accession No. E2004498703873, Proceedings of SPIE—The International Society for Optical Engineering—Three-Dimensional Image Capture and Applications VI 2004 SPIE US, vol. 5302, 2004, pp. 95-104, XP002518992.

S. Battiato et al., "Depth Map Generation by Image Classification", Proceedings of SPIE Electronic Imaging 2004, Three-Dimensional Image Capture and Applications VI—vol. 5302-13.

V. Nedovic et al., "Depth Information by Stage Classification", IEEE 11th International Conference on Computer Vision, 2007, ICCV 2007.

Sylvain Paris et al., "A Fast Approximation of the Bilateral Filter using a Signal Processing Approach", Proceedings of European Conference on Computer Vision (ECCV'06), 2006.

* cited by examiner

METHOD AND DEVICE FOR GENERATING A DEPTH MAP

FIELD OF THE INVENTION

The invention relates to a method and device for generating a depth map for an image using monocular information as well as to a computer program product on a computer readable medium for generating a depth map for an image using monocular information.

BACKGROUND OF THE INVENTION

Over the last decade a substantial amount of research has been directed at the realization of 3D display technology for use in and around the home. As a result there has been a flurry of both stereoscopic as well as autostereoscopic displays.

In stereoscopic displays, the eyes of the viewer are generally assisted by e.g. glasses or foils positioned between the viewers eyes and the display to direct in a time-multiplexed or simultaneous manner (e.g. through spectral separation) a left eye image to the left eye of the viewer and a right eye image to the right eye of the viewer. As generally users find wearing glasses bothersome, autostereoscopic displays have likewise received considerable attention. Autostereoscopic displays, often multi-view displays, generally allow the visualization of multiple; e.g. 5-9 or more images or views which are multiplexed in a viewing cone directed at the viewers. By observing separate views from a cone with the left and right eye respectively a stereoscopic effect is obtained by the unaided eye.

An important issue for both stereoscopic displays and autostereoscopic displays is the delivery of content. Various approaches are known to deliver three-dimensional content to a display. Some of these approaches explicitly encode all views, whereas others encode one or some views and additional depth and/or disparity information for one or all of these views. The advantage of providing depth information is that it facilitates manipulation of the three-dimensional content e.g. when rendering additional views based on the images provided.

Although such depth information can be acquired through analysis of e.g. disparity of stereo images, or using range finders, this is generally only possible for newly acquired content. Moreover stereo or multiview acquisition generally also comes at a higher cost. As a result there has been substantial research directed towards the acquisition of depth information from monocular images, or monocular image sequences. A variety of applications of such algorithms may be envisaged ranging from fully automated conversion, to user assisted 2D to 3D conversion for high quality content. In case of user assisted 2D to 3D conversion computer assisted depth map generation may represent a substantial time saving.

An example of an approach to obtain a depth map from a monocular image is presented in "Depth Map Generation by Image Classification", by S. Battiato, et al, published in Proceedings of SPIE Electronic Imaging 2004, Three-Dimensional Image Capture and Applications VI—Vol. 5302-13.

In the above paper a depth map is generated by combining a depth map based on an estimated global depth profile of an image which is then combined with a further depth map which comprises image structure. The resulting combination however does not always provide for a satisfactory depth perception in the resulting image.

SUMMARY OF THE INVENTION

Accordingly, the invention has for its object to provide an alternative method that provides an alternative depth map.

The above is achieved by a method of generating a depth map for an image using monocular information, the method comprising generating a first depth map for the image, wherein the first depth map corresponds with an estimate of a global depth profile of a scene depicted in the image, generating a second depth map for the image, wherein a depth value associated with a pixel in the second depth map is based on depth values in the first depth map within a region spatially proximate to the pixel and at least one of color and luminance values of the image within the region and generating a third depth map for the image using depth values from the first depth map and the second depth map, the generating scaling a depth difference, such that a difference between a depth value of the third and first depth map is scaled compared to the corresponding difference between a depth value of the second and first depth map.

The generation of the third depth map is based on two underlying depth map components, the first and the second depth map, both are based on an estimated global depth profile underlying this first depth map. In particular when the image is an image from an image sequence, this global depth profile is likely to be similar for adjacent images in the sequence and thus contributes to temporal stability of the third depth map.

The second depth map generation in turn effectively incorporates local structure into the global depth profile. During the generation of the second depth map luminance and/or color similarity in the image are used to assign depth values. As a result depth values of objects which have similar color and/or luminance in the image are locally made more similar, thereby resulting in structures having similarity in the image obtaining depth values that are generally more similar and often distinct from the global depth profile.

It is noted that the similarity mentioned above, may be quantified as falling within a predetermined variation of color and/or luminance values.

Finally the third step combines the generated first and the second depth map in a manner that effectively scales some of the differences between the first and the second depth map. In one embodiment according to the present invention this allows the introduction of a more pronounced difference between local structure and the global depth profile. In this manner the often somewhat subtle differences between the first and the second depth map can be enhanced for objects resulting in a more dynamic depth map. Alternatively it is possible that the local structures in the second depth map are too pronounced, in which case scaling with a factor between zero and one can improve the 3D viewing experience.

It is noted that when generating a depth value for a pixel in the second depth map, depth values from the first depth map, in a region around the corresponding pixel in the first depth map, are used. Preferably the depth values of such proximate depth values are weighted based on color and/or luminance similarity, although other image attributes could be used as well such as e.g. image motion, local edginess and/or the amount of texture in the proximity. In this manner depth values associated with pixels of similar color and/or luminance contribute more to the depth value of the pixel in the second depth map than pixels that are less similar.

It is noted that proximate here is intended to imply local rather than global; i.e. not based on the image in its entirety. In practice proximate often relates to pixels within an aperture. Although the aperture may be of predetermined shape and/or size, it may also be possible to dynamically adapt the aperture e.g. based on further image information.

In an embodiment the first depth map is based on a depth map template. Such a template can be a simple generic template, such as a slant; i.e. a gradient from the foreground at the bottom of the scene, to background at the top. An alternate slant may comprise a horizon at a certain vertical position defining the start of the background. Alternatively a more complex parameterizable template can be constructed such as that disclosed in the above cited "Depth Map Generation by Image Classification", by S. Battiato, hereby incorporated by reference. Here an example is presented on how a parameterizable global depth profile can be constructed based on image analysis. Generally speaking a depth map template consists of an estimate of the depth profile of a particular type of scene and thus may show considerably variation; e.g. consider the differences between a typical depth profile of an in-door dialogue scene, or a fish-eye close-up.

In a preferred embodiment, the generation of the second depth map comprises the application of a bilateral filter on one of color and luminance values in the image and the depth values in the first depth map. As a result there is no need for segmentation of the image, yet at the same time color and/or luminance variations within the image may be exploited to prevent depth values from one side of a color transition to contribute to the depth values of pixels on the other side of the color transition. As a result the depth values in the second depth map corresponding to areas having a particular color and/or luminance similarity will generally have more similar depth values than corresponding areas in the first depth map. As a result, objects will be made more distinct from the global depth profile.

In a further preferred embodiment, a depth value for the third depth map is set to a depth value corresponding with a depth closest to a viewpoint of the scene and is:
the corresponding depth value in the first depth map or
a candidate depth value based on a corresponding depth value from the second depth map. In practice typically the depth value for the third depth map is set to the maximum of the depth value in the first depth map and the candidate depth value based on a corresponding depth value from the second depth map. As a result of this particular measure the depth values in the third depth map will not be placed behind the global depth profile. Consequently (parts of) objects that in the second depth map were placed behind the global depth profile will be set to the global depth profile. It will be noted that further candidate depth values are envisaged.

The above mentioned candidate value in an advantageous embodiment comprises the depth value from the first depth map plus a weighted difference of the depth value from the first depth map and the corresponding depth value from the second depth map. As a result the enhancement may be tuned, possibly even under user/viewer control. Alternatively the candidate value may comprise a threshold depth value based on one or more depth values in spatial proximity of the depth value from the first depth map. In this manner the depth values for objects having a particular color or luminance can be further enhanced.

In an embodiment the image for which a depth map is generated is part of an image sequence. As a first order approximation, the image sequence may be partitioned in shots, and subsequently a global depth profile can be selected based on the images in a shot. In this manner time consistency of the generated depth maps may be further improved.

In a more advanced method, which may be particularly advantageously combined with e.g. a parameterizable depth map template, the global depth profile is determined based on more than one image of a shot; e.g. the first and the last image in the shot, or provided that there are further variations within the shot on a larger number of images/frames.

Although the above embodiments are particularly advantageous, this does not exclude further embodiments, such as an embodiment wherein the global depth profile is selected based on every image/frame of an image sequence in isolation, or more optionally through assessment of the current image/frame as well as the last global depth profile used.

The invention further has for its object to provide an alternative device that provides an alternative depth map.

The above is achieved by a device for generating a depth map for an image using monocular information, the device comprising: receiving means arranged to receive the image and processing means, the processing means configured to: generate a first depth map for the image, wherein the first depth map corresponds with an estimate of a global depth profile of a scene depicted in the image, generate a second depth map for the image, wherein a depth value associated with a pixel in the second depth map is based on depth values in the first depth map within a region spatially proximate to the pixel and at least one of color and luminance values of the image within the region and generate a third depth map for the image using depth values from the first depth map and the second depth map, the generating scaling a depth difference, such that a difference between a depth value of the third and first depth map is scaled compared to the corresponding difference between a depth value of the second and first depth map.

The above is further achieved by a computer program product on a computer readable medium for generating a depth map for an image using monocular information.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

As indicated above the generation of depth maps for an image using monocular information is more complex than when using stereo images. In case of stereo or multiview images it often is possible to use disparity between respective views of a scene to obtain depth information regarding the scene depicted in the views.

Although stereo and to a lesser extent multiview acquisition means are becoming available, there generally is still an additional cost involved in using such means compared to monocular acquisition means. Moreover for existing monocular content it often is not possible to re-capture in dual-view, i.e. stereo or multi-view format.

As a result there is a need for methods for generating a depth map of an image using monocular information.

Figure 1:
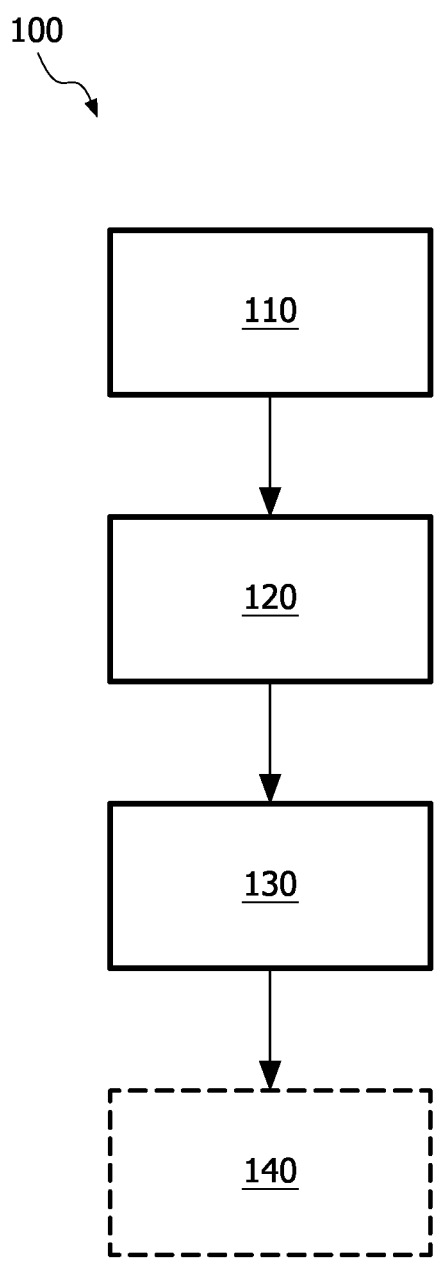
FIG. 1, shows a flow-chart of a method according to the present invention.

FIG. 1 shows a flow-chart of a method 100 according to the present invention. The method 100 represents a method of generating a depth map for an image using monocular information. The method comprises a first step for generating 110 a first depth map for the image. During this first step a depth map is generated, generally a depth map for all pixels in the image, wherein the depth values in the first depth map corresponds with an estimate of a global depth profile of a scene depicted in the image.

In "Depth Information by Stage Classification" by V. Nedovic, et al, IEEE 11$^{th}$ International Conference on Computer Vision, 2007, ICCV 2007, hereby incorporated by reference, a classification of images into 5 global and 11 more specific depth stages is presented, as well as a method of mapping images onto such depth stages. The global stages correspond to a first stage comprising, sky, background and ground, e.g. a landscape shot. A second stage comprising a box, typically suited for indoor scenes. A third stage called a corner stage, typically suited for indoor scenes. A fourth stage for one or more persons in front of a background and finally a fifth stage comprising scenes that have no depth.

Although the classification used in the above paper is particularly advantageous, it should be noted that it is not exhaustive but could be easily extended by the skilled person. For example, the model presented in the paper does not provide a global depth profile that corresponds to a macro shot made using a fish-eye lens.

Figure 4:
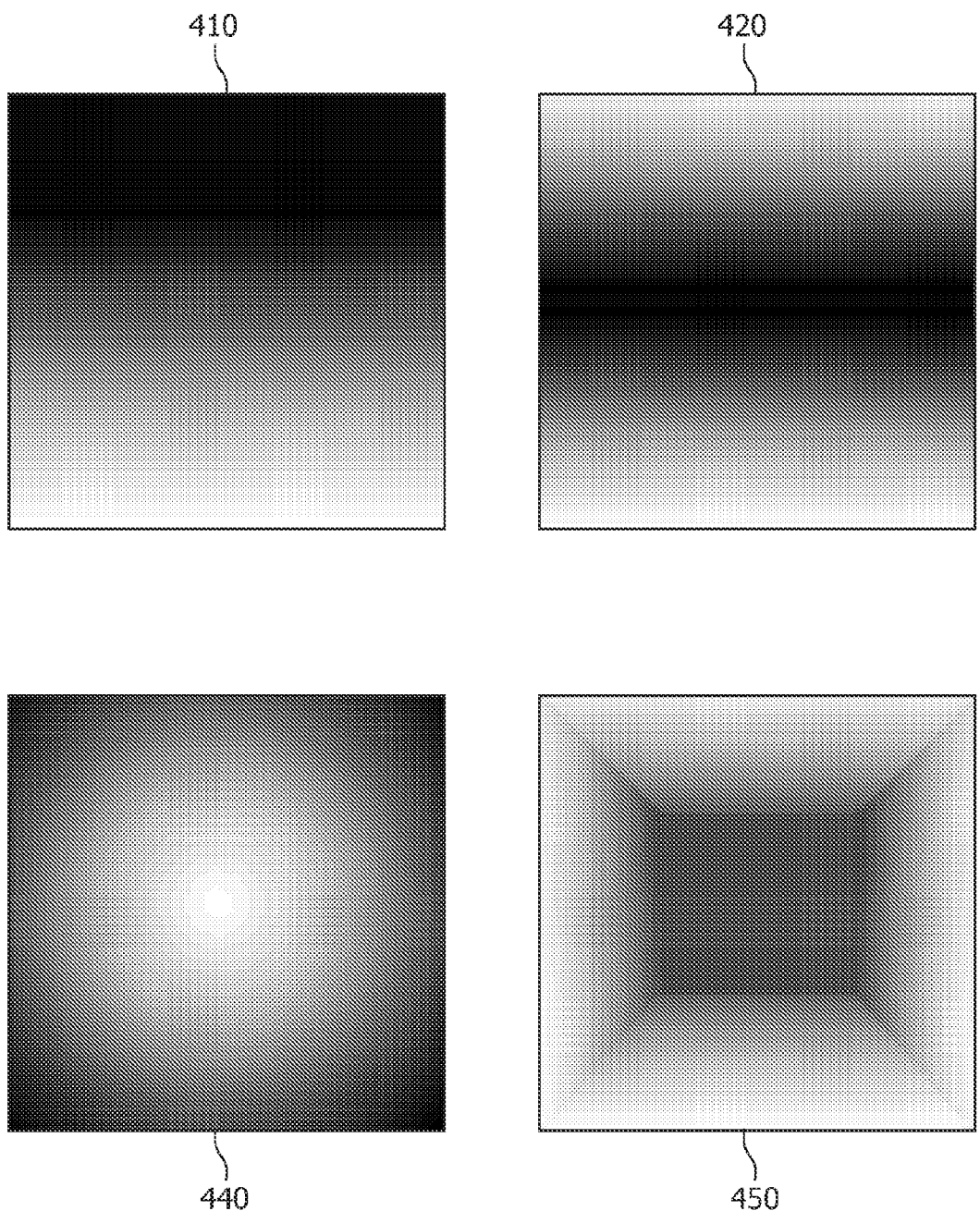
FIG. 4, shows several estimates of a global depth profile of a scene.

FIG. 4 provides several examples of depth maps of global depth profiles, which could be used for certain images. Here image 410 provides a gradient of foreground at the bottom to background at the top of the image. It will be clear to those skilled in the art that generally it may be beneficial when using such a profile to refine this profile by detecting the horizon and subsequently placing all pixels above the horizon in the background. Alternatively it may be advantageous to create a landscape with more ominous clouds. In the latter case the image 420, which comprises two vertical gradients may be used. As a result clouds which are located at the top of the image are located nearer to the viewer than those at the horizon.

Image 440 in turn shows a depth map for a global depth profile for a fisheye macro-shot, consisting of a circular gradient with a white center and darker rings towards the edge of the image. As a result the center of the image is nearest and the edges of the image are the farthest removed from the viewpoint from which the image was observed. Finally image 450 provides a depth map for a simple box like scene viewed frontally.

Once more with reference to FIG. 1, following the generation of the first depth map, the next step corresponds to generating 120 a second depth map for the image. In the second depth map a depth value associated with a pixel is based on both:
- depth values in the first depth map within a region spatially proximate to the pixel and
- color and/or luminance values of the image within the region.

It is noted that the second depth map is explicitly based on the first depth map and color and/or luminance information in the image. As a result the second depth map typically allows distinguishing of objects having a distinct color and/or luminance from the global depth profile.

In a preferred embodiment the generation of the second depth map involves a bilateral filter over e.g. the depth values in the first image on one hand and the color information of the image on the other hand.

In order to add local structure to a depth map a cross or joint bilateral filter may be used.

Bilateral filters are non-linear filters that utilize both the (spatial) domain and the (intensity) range properties. Equation (1) herein below shows a basic bilateral filter. An output image $O_p$ is determined by a weighted average of pixels at positions q from input image $I_q$ in a neighborhood S of position p. The weight calculation depends on spatial distance function s and intensity range function r. Function s here is a conventional 2D convolution filter kernel. Function r in turn decreases with larger intensity differences to deliver edge preservation characteristics.

$$O_p = \sum_{q \in S} w_{p,q} I_q \bigg/ \sum_{q \in S} w_{p,q} \qquad (1)$$

where $$w_{p,q} = s(\|p-q\|) r(\|I_p - I_q\|)$$

Preferably the functions s and r are implemented as indicated below in equations (2) and (3), wherein $$s(x) = e^{-\alpha x} \qquad (2)$$

and $$r(x) = e^{-\beta x} \qquad (3)$$

As mentioned above a particularly advantageous manner to introduce local depth information based on range information from color and/or luminance information from a second image is to apply a cross or joint bilateral filter. In an embodiment of the present invention the second depth map is generated using such a joint bilateral filter. The joint bilateral filter is used to filter the first depth map representing an estimate of the global depth profile of a scene using range information (color and/or luminance) from an input image.

Equation (4) shows how a second depth map $D2_p$ may be generated using a first depth map $D1_p$, representing an estimate of the depth profile of the scene, and image contents from the image I.

$$D2_p = \sum_{q \in S} w_{p,q} D1_q \bigg/ \sum_{q \in S} w_{p,q} \qquad (4)$$

where $$w_{p,q} = s(\|p-q\|) r(\|I_p - I_q\|)$$

Although the above provides a particularly effective method of generating a second depth map, the second depth map may be generated in other manners known to those skilled in the art.

The Bilateral Filter can preferably be formulated in the higher-dimensional Bilateral Grid domain, as described in "A Fast Approximation of the Bilateral Filter using a Signal Processing Approach" by Sylvain Paris and Frédo Durand, published in Proceedings of European Conference on Computer Vision (ECCV'06), 2006, hereby included by reference. This formulation uses a coarse 3D grid to downsample the data, and therefore can be implemented very efficiently. This approach may be advantageously combined with the method disclosed herein since the scaling operation to generate the third depth map can in a preferred embodiment be executed in the downsampled 3D grid, before upsampling. In the above paper Paris and Durand show that downsampling can be done for the bilateral filter itself. When applied to the present invention this implies that both the first and the second depth map may be generated at a lower resolution.

Referring again to FIG. 1, following the generation of the second depth map the method proceeds with a step for generating 130 a third depth map for the image using depth values from the first depth map and the second depth map, the generating scaling a depth difference, such that a difference between a depth value of the third and first depth map is scaled compared to the corresponding difference between a depth value of the second and first depth map.

Figure 3A:
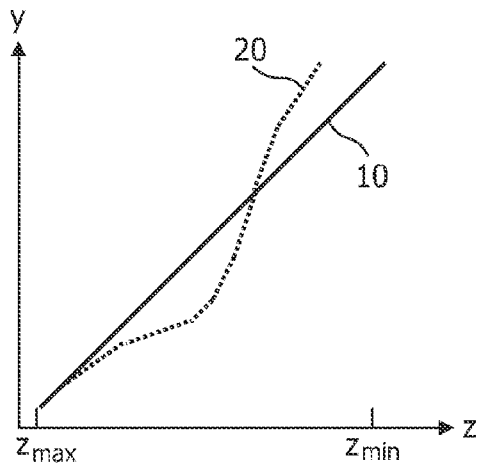
FIG. 3A, shows a vertical cross section of a first and a second depth map.
Figure 3B:
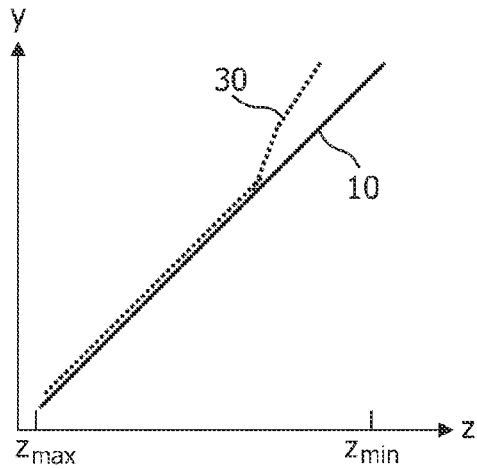
FIG. 3B, shows a vertical cross section of two depth maps.

The above is once more visually presented in the FIGS. 3A-3D. FIG. 3A shows a vertical cross section 10 of a first depth map and a vertical cross section of a second depth map 20. As can be seen the first depth map corresponds with a slant. The second cross section in turn corresponds with a curve that somewhat follows the first depth map, but locally deviates therefrom. This second curve is an example curve which could be generated using e.g. a bilateral filter as described above.

Although a bilateral filter is a particularly advantageous, other approaches are envisaged such as e.g. through the use of segmentation of the input image followed by T-junction detection where the sparse local ordering provided by the T-junctions can be integrated into a dense depth profile using the values from the first global depth map. FIG. 3B shows again vertical cross section 10 as well as a third vertical cross section 30 in accordance with the present invention which corresponds with the maximum (in the z-direction) over the cross sections 10 and 20. Here the depth values d3(y) correspond with respective depth values of the vertical cross section 30 correspond with:

$$d3_{30}(y) = \max(d1(y), d2(y)) \quad (5)$$

where d1(y) corresponds with respective depth values of cross section 10 and where d2(y) corresponds with respective depth values of cross section 20.

Figure 3C:
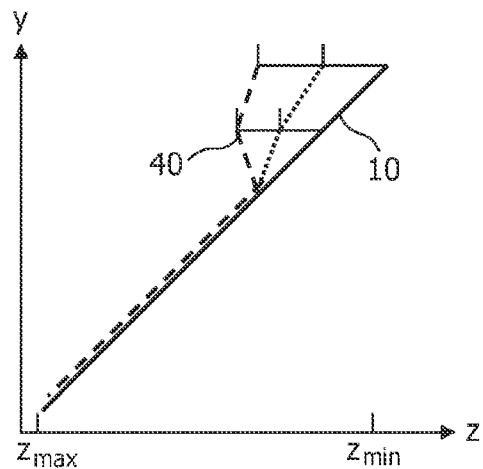
FIG. 3C, shows a vertical cross section of three depth maps.

FIG. 3C in turn shows a fourth vertical cross section 40 in accordance with the present invention, based on cross section 30. Cross section 40 is shown together with cross section 30 in order to elucidate that points on cross section 40 which are in front of the slant (cross section 10), are located twice as far from the slant as the corresponding points on cross section 30.

$$d3_{40}(y) = \max(d1(y), \omega \cdot (d2(y) - d1(y)) \quad (6)$$

By selecting an appropriate value for ω the depth differences may be further accentuated or reduced. When creating a depth map, this parameter allows the user to enhance the depth map variations based on local color and/or luminance variation. As a result the depth map of the image will be more likely to show a proper correlation with the image information and as a result will provide a more lively appearance, whereas lower values of ω will result in a depth map that primarily reflects the general depth profile of the scene.

It will be clear to the skilled person that the choice whether or not to amplify the difference or attenuate the difference is something that is highly dependent on the nature of the second depth map. In case the second depth map shows a substantial difference with the first depth map it may be necessary to attenuate the differences. Whereas when the differences are typically smaller amplification of the difference may be in order.

Figure 3D:
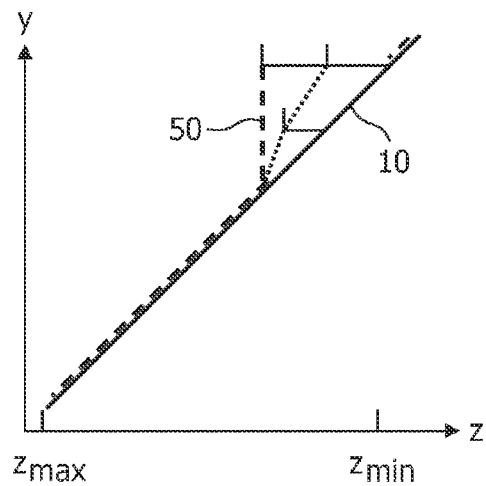
FIG. 3D, shows a vertical cross section of three depth maps.

FIG. 3D in turn shows a fifth vertical cross section 50 also in accordance with the present invention. The fifth cross section in turn shows that the depth values for points on the cross section 40 which are in front of the slant are set to a threshold value $d2_T(y)$. The threshold value here is determined by means of a vertical scan based on color and/or luminance similarity. In case during such a vertical scan (here bottom to top) a section is encountered that stands out from the background in color and/or luminance and has a substantially higher depth value, then a threshold value can be chosen for this section based on the depth values encountered in the scan. The depth values below and above this section (in the scan direction) in turn would typically reflect the global depth profile present in the first depth map; i.e. unless there are other sections present. This process is visualized in FIG. 3D by extending the depth values along the background slope for the cross section 50 at the top hand right. Here a "discontinuity" in the depth values is shown, which corresponds with color and/or luminance discontinuity in the image.

$$d3_{50}(y) = \max(d1(y), d2_T(y)) \quad (7)$$

As indicated hereinabove, by formulating the bilateral filter used for generating the second depth map in the higher-dimensional Bilateral Grid domain, the depth map generation becomes more efficient. However, this particular implementation additionally provides for a further advantage; because this particular formulation of the bilateral filter provides an additional separation in the extra luminance (or color) dimension. This in turn implies that a single scan may be used as exemplified in FIG. 3D, wherein each respective section having a luminance (or color) similarity may be processed in isolation. As a result this particular implementation provides a bonus effect as there no longer is a need to explicitly detect any discontinuities.

Figure 5:
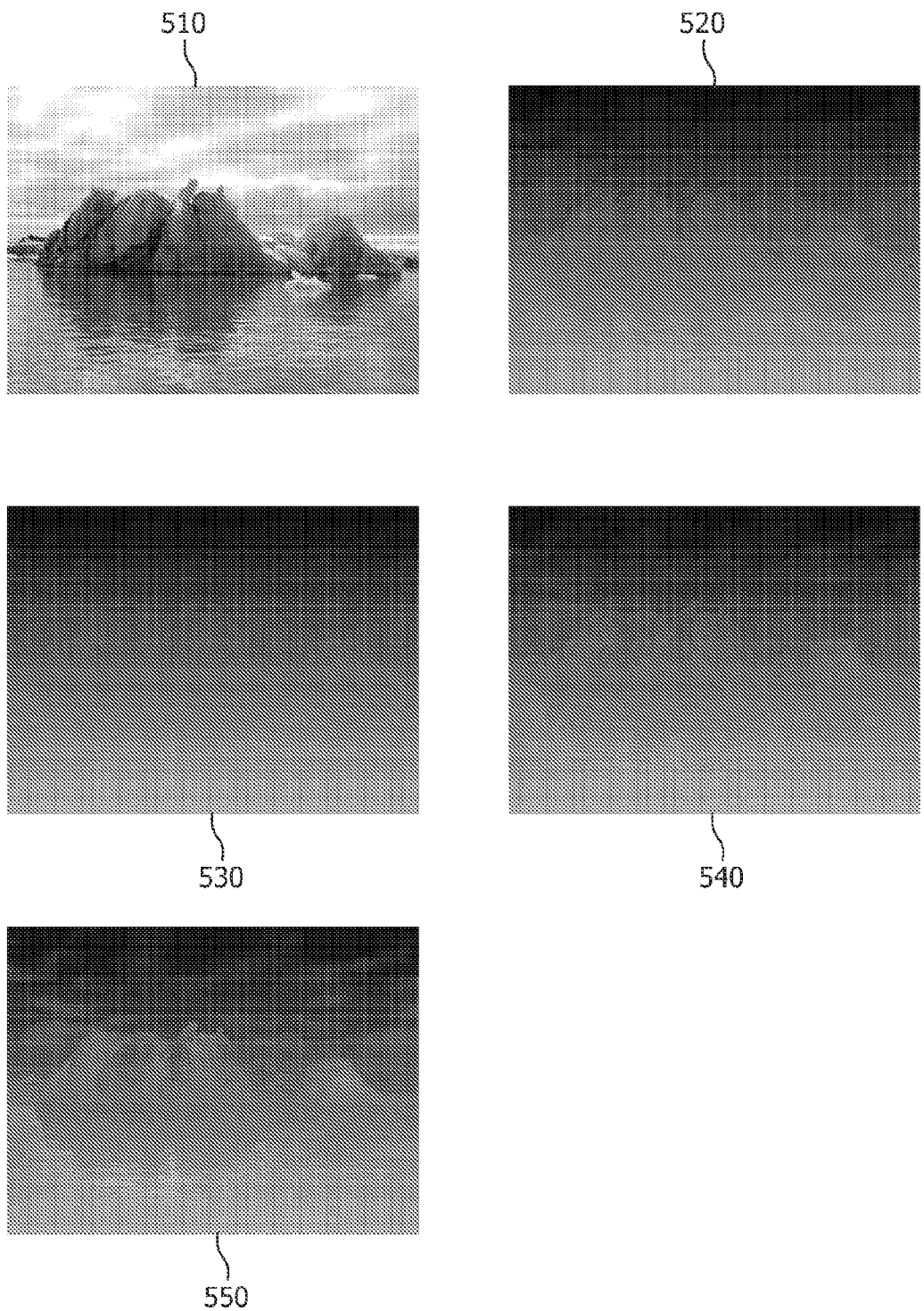
FIG. 5, shows output of several steps of a method according to the present invention.

The method from FIG. 1 is further illustrated in FIG. 5. FIG. 5 shows a series of image sections which have been processed using a method according to the present invention. Image 510 comprises a section of an input image, this particular section corresponds to a scenic view of some icebergs, wherein the bottom of the image 510 corresponds to foreground and the top of the image corresponds to background.

A second depth map based on a slant is provided in image 520, it is noted that the slant is subsequently filtered using a bilateral filter using both the first depth map as well as the luminance of the image. Subsequently image 530 provides an image corresponding with an intermediate value which corresponds with the max of the first and the second depth map.

In order to further enhance the depth impression, the present invention proposes to enhance the differences, here by a factor 2, between the first and the second depth map, in line with the example shown in FIG. 3C. The resulting image 540 shows some improvement over image 530, in particular in that parts of the icebergs are brought forward compared to the sky behind it.

Image 550 shows the same procedure, here enhanced by a factor 4. As a result the depth impression of the foreground objects is further improved.

Figure 2:
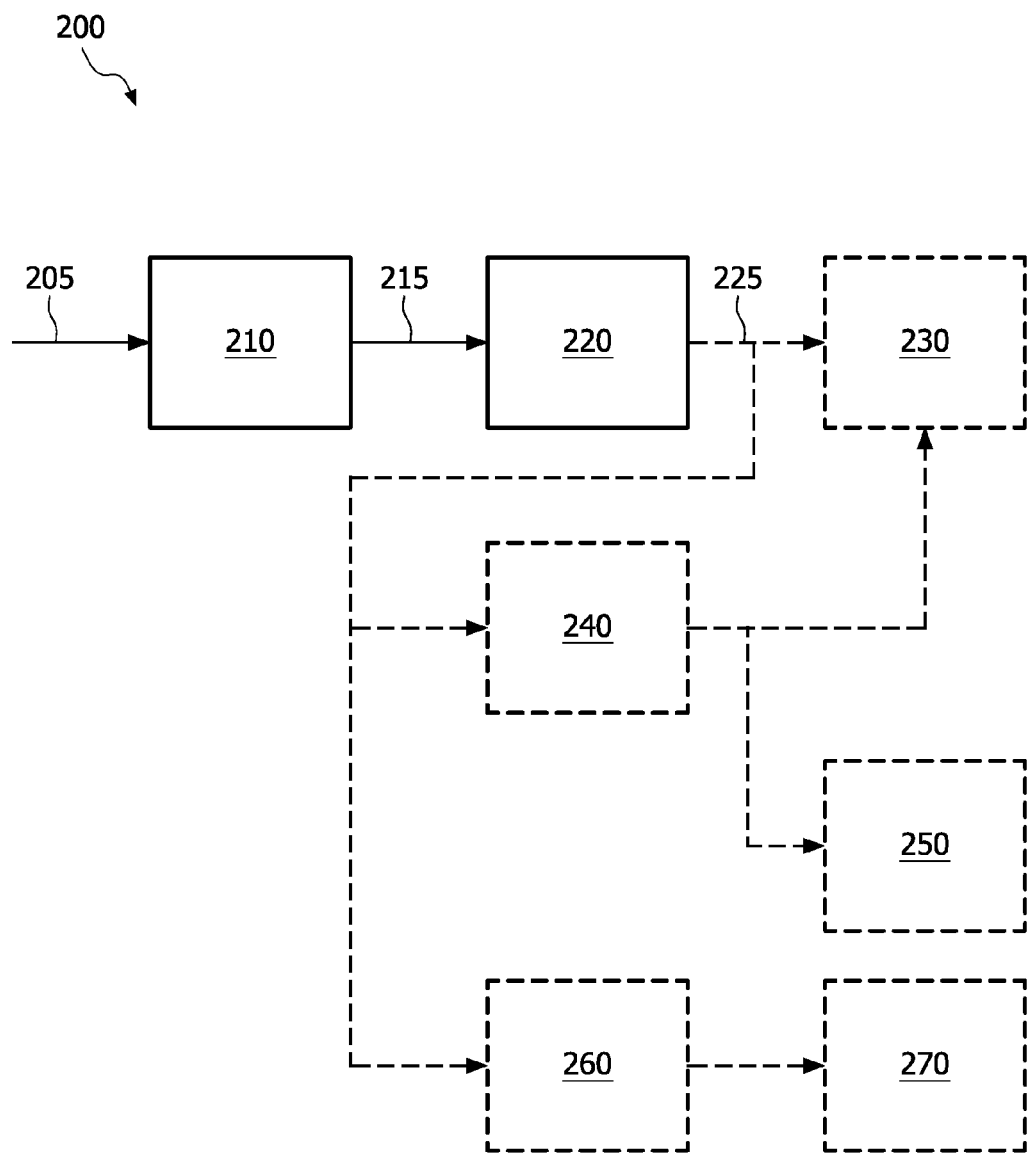
FIG. 2, shows a block-diagram of a device according to the present invention.

FIG. 2 shows a device 200 for generating a depth map for an image 205 using monocular information according to the present invention. The device 200 comprises receiving means 210 arranged to receive the image. Although the example for the sake of clarity is discussed with reference to the generation of a depth map for a single image only, it will be clear to the skilled person that this can be modified for the generation of depth maps for image sequences. In fact the device according to the present invention is preferably a device suitable for 2D to 3D conversion of monocular image sequences into a three dimensional video signal comprising e.g. parallel streams of image information and depth information.

The device 200 further comprises processing means 220. Such processing means generally may be implemented in a variety of ways, e.g. using a general purpose processing platform, using digital signal processors and or using Application Specific Integrated Circuits. The processing means 200 is configured to generate a first depth map for the image 205. The first depth map corresponds with an estimate of a global depth profile of a scene depicted in the image.

The processing means is further configured to generate a second depth map for the image. Depth values in the second depth map are typically associated with a single pixel in the image, although the resolution of the depth map may in certain embodiments of the present invention be subsampled in comparison to the resolution of the image 205.

A depth value in the second depth map associated to a particular image pixel is based on depth values in the first depth map within a region spatially proximate to the image pixel. In addition it is based on color or luminance values of image pixels within the region. As a result the second depth map may comprise local depth information compared to the global depth information present in the first depth map.

The processing means is further configured to generate a third depth map 215 for the image 205 using depth values from the first depth map and the second depth map. When generating the depth values in the third depth map, often subtle depth differences between the first and second depth map are scaled. As a result, particular differences between particular depth values of the third and corresponding depth values of the first depth map are scaled compared to the corresponding differences between a depth value of the second and first depth map.

Optionally the device 200 may further comprise additional software/hardware means for handling the third depth map.

For example, the third depth map 215 may subsequently be processed further within the device 200, or may alternatively be stored for later use on a storage means 230. Alternatively the third depth map may be encoded by an encoding means 240 preferably together with the image 205 into a three dimensional image signal. Such encoded image signal may then be stored on the storage means 230 or transmitted by means of a transmitting means 250, e.g. for transmission by means of cable or RF, using e.g. a protocol such as the IP protocol.

More alternatively the third depth map may serve as input preferably together with the image 205 for rendering of one or more views by a rendering means 260. The rendered views in turn may be output on a three-dimensional (auto)stereoscopic display means 270.

It will be appreciated that the above description for clarity has described embodiments of the invention with reference to various functional units. However, it will be apparent that any suitable distribution of functionality between different functional units (or processors) may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. Method (100) of generating a depth map for an image (205) using monocular information, the method comprising:
    generating (110) a first depth map for the image (205), wherein the first depth map corresponds with an estimate of a global depth profile (410, 420, 440, 450) of a scene depicted in the image (205),
    generating (120) a second depth map (520) for the image (205), wherein a depth value associated with a pixel in the second depth map is based on depth values in the first depth map within a region spatially proximate to the pixel and at least one of color and luminance values of the image within the region and
    generating (130) a third depth map (530, 540, 550) for the image (205) using depth values from the first depth map and the second depth map, the generating scaling a depth difference, such that a difference between a depth value of the third and first depth map is scaled compared to the corresponding difference between a depth value of the second and first depth map.

2. Method of claim 1, wherein depth differences are scaled for multiple pixels in a spatial region having at least one of color and luminance similarity.

3. Method of claim 1, wherein the scaling involved in the generating (130) magnifies the depth difference.

4. Method of claim 1, wherein the generation of the second depth map comprises the application of a bilateral filter on one of color and luminance values in the image and the depth values in the first depth map.

5. Method of claim 1, wherein a depth value for the third depth map is set to a depth value corresponding with a depth closest to a viewpoint of the scene and is selected from one of:
the corresponding depth value in the first depth map and
a candidate depth value based on a corresponding depth value from the second depth map.

6. Method of claim 5, wherein the candidate depth value is the depth value from the first depth map plus a weighted difference of the depth value from the first depth map and the corresponding depth value from the second depth map.

7. Method of claim 6, wherein the candidate depth value is a threshold depth value based on depth values in spatial proximity of the depth value from the first depth map.

8. Method of claim 1, wherein the image is part of an image sequence, and wherein the estimate of the global depth profile is identical for all images in a shot.

9. Method of claim 1, wherein the image is part of an image sequence, and wherein the estimate of the global depth profile is determined based on more than one image of a shot.

10. Device (200) for generating a depth map for an image (205) using monocular information, the device comprising:
receiving means (210) arranged to receive the image and
processing means (220), the processing means configured to:
generate a first depth map for the image (205), wherein the first depth map corresponds with an estimate of a global depth profile (410, 420, 440, 450) of a scene depicted in the image (205),
generate a second depth map (520) for the image (205), wherein a depth value associated with a pixel in the second depth map is based on depth values in the first depth map within a region spatially proximate to the pixel and at least one of color and luminance values of the image within the region and
generate a third depth map (530, 540, 550) for the image (205) using depth values from the first depth map and the second depth map, the generating scaling a depth difference, such that a difference between a depth value of the third and first depth map is scaled compared to the corresponding difference between a depth value of the second and first depth map.

11. Device of claim 10, wherein the processing means are configured such that depth differences are scaled for multiple pixels in a spatial region having at least one of color and luminance similarity.

12. Device of claim 10, wherein the processing means are configured such that a depth value for the third depth map is set to a depth value corresponding with a depth closest to a viewpoint of the scene and is selected from at least:
the corresponding depth value in the first depth map and
a candidate depth value based on a corresponding depth value from the second depth map.

13. Device of claim 12, wherein the processing means are configured such that the candidate depth value is the depth value from the first depth map plus a weighted difference of the depth value from the first depth map and the corresponding depth value from the second depth map.

14. Device of claim 10, wherein the image is part of an image sequence, and wherein the estimate of the global depth profile is identical for all images in a shot.

15. Device of claim 10, wherein the image is part of an image sequence, and wherein the estimate of the global depth profile is determined based on more than one image of a shot.

16. A computer program product on a computer readable medium for generating a depth map for an image using monocular information, the product comprising instructions for executing the method steps according to claim 1.

* * * * *